United States Patent [19]

Clark

[11] 4,096,592
[45] Jun. 27, 1978

[54] COMPOSTING TOILET

[76] Inventor: Alexander Clark, 115 Pleasant St., Brunswick, Me. 04011

[21] Appl. No.: 757,014

[22] Filed: Jan. 5, 1977

[51] Int. Cl.² .................. A41K 11/02; C05F 3/04
[52] U.S. Cl. ........................... 4/111; 4/111.2; 4/DIG. 12
[58] Field of Search ............ 4/111, 1, 110, 120, 4/131, DIG. 12; 23/259.1; 71/9, 10

[56] References Cited

U.S. PATENT DOCUMENTS

| 3,859,672 | 1/1975 | Modig | 4/111 |
| 3,918,106 | 11/1975 | Hellgvist | 4/120 |
| 3,921,228 | 11/1975 | Sundberg | 4/131 |

FOREIGN PATENT DOCUMENTS

| 2,241,603 | 3/1973 | Germany | 4/DIG. 12 |
| 2,243,637 | 3/1973 | Germany | 4/DIG. 12 |
| 2,253,737 | 5/1973 | Germany | 4/DIG. 12 |

*Primary Examiner*—Henry K. Artis
*Attorney, Agent, or Firm*—William Nitkin

[57] ABSTRACT

An improved composting toilet comprising a casing member having therein a waste pile platform with means for the entry of heated air therein and vent means therefrom, incorporating an air bypass tube for passage of air from below the waste pile platform and for improved circulation for the enhancement of aerobic decomposition activity and improved evaporation charcteristics.

5 Claims, 3 Drawing Figures

COMPOSTING TOILET

BACKGROUND OF THE INVENTION

The device of this invention relates to the sanitary disposal of body waste and more particularly to devices which operate as composting toilets.

In many areas it is not desirable to use the standard water closet style toilet. This can be due to a variety of reasons, for example, the lack of proper sewer systems, the fact that the placement of a septic tank, cesspool or other inground means of disposal of the body waste could contaminate the water supply, or that the use of such a toilet is against laws and regulations controlling the environment. An alternative to the standard water closet toilet would also be necessary in areas where former disposal fields have become clogged and can no longer accept waste products. This problem occurs in many homes that are near bodies of water or vacation homes that are located far from populated areas where one might wish to preserve the environment by preventing sewer waste from entering the environment.

One method of disposing of body waste products which avoids the aforementioned problems is the composting toilet. The composting toilet has long been in use in other countries and is just coming into use in the United States. Composting toilets allow for the effective decomposition and evaporation of human waste products into a smaller volume of humus which can then be plowed into the soil or otherwise disposed of. These toilets can be effectively utilized in areas where there is no water available for a standard type water closet style toilet. For those wishing to limit their consumption of water, the use of a composting toilet can effect a savings of 40,000 to 50,000 gallons of water per year for an average household. There are also further savings involved since composting toilets do not require the installation of plumbing and drainage systems.

Composting toilets aerobically decompose waste material deposited therein. Waste solids are decomposed by aerobic microorganisms in a highly aerated, warm and moist environment. Preferably the temperature should be between 90°-120° F. with the humidity at least 80%. Nutrients such as ample carbon, which can be peat moss, and nitrogen which can be derived from manure supplied to the composting toilet are also required for optimum decomposition of the waste material. When the above-mentioned factors are at an optimum, the waste products decompose at a much faster rate than they would if left in a natural state. The temperature of the medium within the composting toilet is crucial to its proper operation and the decomposition of the waste products. A temperature below 90° F. may be too low for aerobic microorganisms to survive and properly perform their decomposing function. With some exceptions almost all pathogens and human parasites are unable to survive in a compost heated to at least 90° F. Nitrogen is another factor in the decomposition of human waste products. The composting toilets usually allow compounds within the solid waste to be nitrified by bacteria and combine with the carbon present into less soluble forms. Some of the nitrogen is evaporated as ammonia which eventually becomes nitrogen in a gas form within the atmosphere. These gaseous products along with carbon dioxide and water vapor are usually vented through a pipe out of the structure which contains the composting toilet.

There are several types of composting toilets presently on the market which can be differentiated broadly by their size. The large inclined box types of composting toilets are less aerobic than smaller composting toilets. The larger varieties closely simulate leaching fields and have beds of peat, top soil, compost and subsoil or bark waste. The larger composting toilets operate at a lower temperature and have a less satisfactory oxygen distribution than the smaller composting toilets and are often referred to as mouldering toilets rather than composting toilets. They require raking down less often than smaller composting toilets and usually suffer from problems with insects and odors. The smaller toilets have a higher degree of aerobic decomposition and can be more satisfactorily used within the home as they are cheaper and operate more efficiently than larger models. The smaller composting toilets are also easier to install and maintain. These smaller aerobic toilets usually have an electrical heating source operating from within the toilet's lower chamber. To eliminate the installation of an electric heater, the smaller composting toilet can be installed directly over a heat source such as over a hot air duct or alternatively during the summer months one could duct a solar panel to it. However, thus far the easiest and most efficient method of heating the medium within the smaller composting toilet is to circulate hot air within the decomposition chamber from a small electric heater by means of a fan element. The composting toilet does not necessarily need a fan member to circulate air as they are usually designed for a natural draft to occur therein from a chimney which leads out of the toilet usually to the roof. An odor problem can occur when the cover of the toilet is opened and the natural draft causes odor from the decomposing waste products to emanate through the top opening of the composting toilet. It has been found that natural drafts can be assisted by the placing of a wind turbine on the top of the chimney. Also the placement of screening completely around the top opening of the chimney prevents insects from entering down the chimney to the medium below. Many composting toilets currently on the market have a seat especially designed to allow air to circulate into the composting chamber and then out and up the chimney pipe. The heating of the smaller composting toilets which are located in homes or other structures are usually controlled by thermostats that are set at approximately 90°-100° F. It is, of course, easier to heat a small composting toilet than a large one due to the smaller mass of material and the smaller volume within the composting toilet. The composting toilets do evacuate amounts of heated air from the house, up and out the chimney. The amounts may average 50 to 100 cubic feet per minute which is approximately 3-4% of the total infiltration loss of an average home. The efficiency of a composting toilet is directly related to its heating and draft system whereby advantages in speedier decomposition can be obtained with less odors emanating from the open seat of the toilet, and less heat loss from the building wherein the unit is used.

The structures of the current models of composting toilets are similar. They usually comprise a box or cylindrical unit with a toilet seat affixed thereon. A holding chamber is located below the toilet seat. When one excretes waste products into the unit, these waste products fall on peat moss or other medium for the decomposition which is located on top of a partition or grid within the chamber. Many units have apertures within this partition or grid for the decomposed matter to fall through onto a tray located below the partition or grid which can be periodically removed from the unit and emptied. Vents for the entry of air are usually located in the unit or around the toilet seat. Each unit usually has an air vent member such as a chimney running out of the building. Many of the units have a fan positioned within the chimney or within the chamber itself to cause air circulation to occur. Composting toilets usually have heating elements, such as plates or grids, located below the peat moss pile or within it to raise the temperature of the medium for more active decomposition to take place. Some units currently available have rotor members which stir the peat material and the waste products to produce a more homogenous mixture. Some units have air recirculation systems which are thermostatically controlled to assist in the evaporation of moisture and to assist in maintaining aerobic conditions at their optimum level. Some units feature built-in hygrometers and air outlet controls. The larger volume units have sloped bottoms causing the waste products to slide down to the bottom of the chamber at a slow rate to assist in the decomposition process. In units currently on the market the draft can be maintained either by natural convection currents or by ventilation fans which assist in drawing air into the waste pile. In such units the air usually enters under the waste pile and rises through openings in the grid member upon which the waste material is deposited. Other units do not utilize air entering from below the waste pile and rely solely on air entering from above in a natural current and being drafted out through the air vent chimney.

SUMMARY

It is a primary object of this invention to disclose a new design for a composting toilet to more efficiently heat the waste pile therein and to more efficiently ventilate the unit causing a better air circulation therein for optimum aerobic conditions, yet preventing total compost dryout. The device of this invention to accomplish the aforementioned objects consists of a unit having a toilet seat which optionally can be sealed air-tight. When waste products are excreted therein, they fall onto a waste pile platform on which there is located peat moss compost. This platform is curved concavely so that the products tend to work their way toward the central area of the decomposition chamber. The waste pile platform has openings within it which run from front to back in elongated fashion. Elongated perforations of this type have been found more beneficial than grid openings in that when raking is done, the humus products more easily fall through the platform into the emptying trays below. The emptying trays within this unit are dual trays which can be removed singley one tray at a time through a small door in the front base of the unit. The heat within the unit can be forced air from a combination heater-fan assembly located within a foot rest member which is activated by a thermostat within the decomposition chamber or can be from another warm air supply. A preferred setting for the thermostat may be 95° F.

A key feature of the invention is an air bypass tube located at the rear of the decomposition chamber. As the forced air is vented through under the waste pile platform, it rises up through the waste pile and is then caused to vent out through the air vent chimney optionally assisted by a small blower located near the front of the chimney opening. This air bypass tube allows some of the air that is forced in by the air heater to pass completely under the waste pile platform and pass up the air bypass tube to where it makes a junction with the air vent chimney. At this junction the air passing up the air bypass tube, being warmer air, continues to pass up the air vent chimney and causes a draft of the air that has passed through the waste pile platform and through the waste pile to be further carried up the air vent chimney. A damper can be utilized within the air bypass tube and can also have an hygrometer to indicate when the damper should be closed in relation to the amount of humidity present in the decomposition chamber. The device of this invention cuts down on odors emanating from the unit as the air is effectively drawn up the chimney and further causes a more efficient circulation of air within the decomposition chamber for increased aerobic activity. Further, the unit can be more easily controlled than units which merely have a heating element within or below the waste pile controlled by a thermostat based solely on the temperature of the composting medium.

DESCRIPTION OF THE PREFERRED EMBODIMENT

Figure 1:
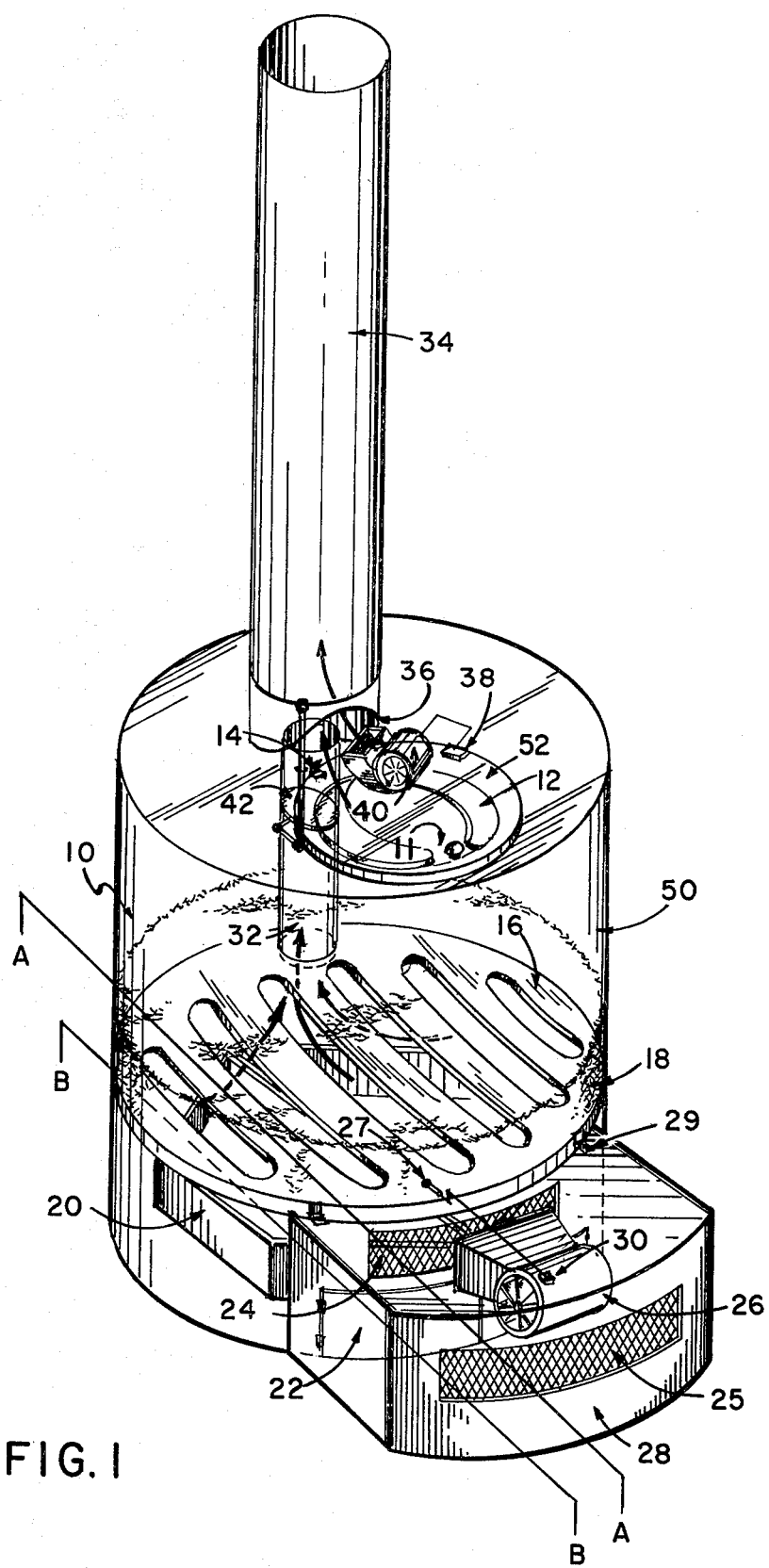
FIG. 1 is a cutaway view of the device of this invention.

FIG. 1 illustrates a cutaway view of the device of this invention exposing the interior structure. The unit falls in the category of the smaller variety of composting toilets. Seen in this view is decomposition chamber 10 having opening 11 over which is positioned seat 12. Seat lid 52 is lifted upon hinges 14 for normal operation of the unit, and the individual using the composting toilet sits on the seat and excretes waste material which falls into decomposition chamber 10 and rests upon waste pile platform 16. Also resting upon the waste pile platform is nutrient medium such as peat moss and manure 18 or equivalent. Waste pile platform 16 has elongated openings 44 therein as seen and described in FIG. 2. The decomposed waste products or humus fall through elongated perforations 44 in the waste pile platform into emptying trays 20. There are two trays 20 as seen in FIG. 3, each of which is separately removable through opening door 22 at the front base of the unit. Also at the front base of the unit is hot air entry vent 24 through which the forced air heater 26 blows hot air when it is activated below the waste pile platform 16. This forced air heater 26 is located within foot rest member 28 and can be deactivated by limit switch 30. If a malfunction causes too high a temperature, limit switch 30 can be set at 190° to 200° F. to prevent the occurrence of fires. Heater 26 is activated by thermostat 27 located within the decomposition chamber. Its position can be in proximity to the hot air entry vent 24. Air bypass tube 32 is seen at the rear of decomposition chamber 10 and is shown leading up to the air vent chimney 34 where there is an open area 36 for allowing the air circulation within the decomposition chamber to be drafted up air vent chimney 34. Blower 40 can be activated by electric switch 38 or equivalent means under the seat to increase the air draft flow up air vent chimney 34. Air bypass tube 32 allows for complete circulation of air within the decomposition chamber even when seat lid 52 is closed preventing air from entering through opening 11 and further preventing a back draft of air out hot air entry vent 24. Air bypass tube 32 assists hot air from hot air entry vent 24 to be carried out through air vent chimney 34. Damper 42 can be located within the air bypass tube 32 and its use can be controlled manually by reference to an hygrometer which is not illustrated but which can be installed within the unit, or it can be automatically controlled by an hygrometer sending electrical impulses to a servodrive type motor. It should be noted that air bypass tube 32 helps assist in preventing air back pressure from occurring from the operation of the forced air heater 26 wherein the air flow would be slowed or stopped by the waste pile 18 thereby causing a back flow of air and accompanying odor into the surrounding area of the composting toilet. The air bypass tube avoids this unpleasant effect and further creates a warm upward draft directly at the point where the air vent chimney 34 leaves the decomposition chamber 10. An air bypass tube of half the diameter of the air vent chimney has been found to work well. It is desirable that the air vent chimney should be a tubular member and preferably extend straight up or have 45° joints where it may be necessary to jog around structural members. In its preferred embodiment the air vent chimney has a rain cover and can be screened to prevent insects from entering through the air vent. It should be insulated once it extends outside the building to prevent internal condensation. It is felt that a unit according to the design disclosed would evacuate about 8 liters of air per second depending upon the amount of heat and the force of the forced air heater 26. It should be noted that a forced air heater is not necessary if another source of heated air is available such as a heating duct which can be attached to air intake 25 positioned at the front of foot rest member 28. The air bypass tube allows some of the air draft to bypass the waste pile and this path contributes to good evaporation of urine. Further the air bypass tube allows air drafts to flow under the bottom of the waste pile platform and allows the heating element or other heat source to be placed outside of the decomposition chamber and not necessarily be buried in the waste pile as is common in other units currently on the market. One clear advantage to the location of the heat source outside the decomposition chamber is that any malfunction of the forced air heater or other heat supply can be worked on without difficulty. Further the dager of a short circuit occurring in a heating element through the waste material placed on top of it is greatly reduced. Another advantage of the structure disclosed is that the hot air entering from the hot air entry vent 24 can create enough of a draft by means of the air bypass tube to be utilized without an electric fan or blower being engaged at the same time. A further advantage is that in this unit the seat opening 11 when closed by its cover lid 52, can be airtight to prevent odors from escaping up into the bathroom or other area where the unit is in use. Many other units on the market utilize a specially designed seat which allows air to circulate in and out of the unit which can allow odors to escape. Within a small composting toilet such as this it is preferable to utilize an innoculated peat moss, preferably sphagnum peat, but not Canadian peat, on the waste pile platform. A desirable mixture is peat moss and composted hardwood bark soil conditioner. Composted cow manure can also be utilized if it is well composted. One should not use a garden compost unless it is extremely old and dug from very deep within the pile as it can bear many insect eggs which would be very undesirable in a unit such as this.

Figure 2:
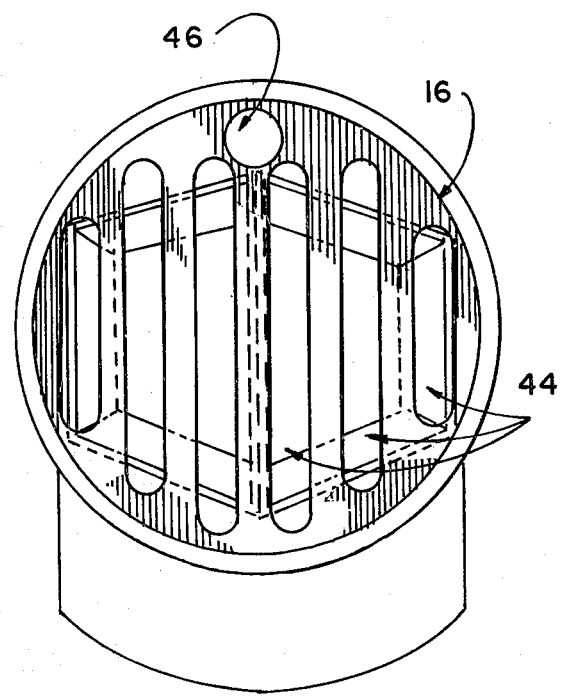
FIG. 2 illustrates a top view of the waste pile platform through section A—A of FIG. 1.
Figure 3:
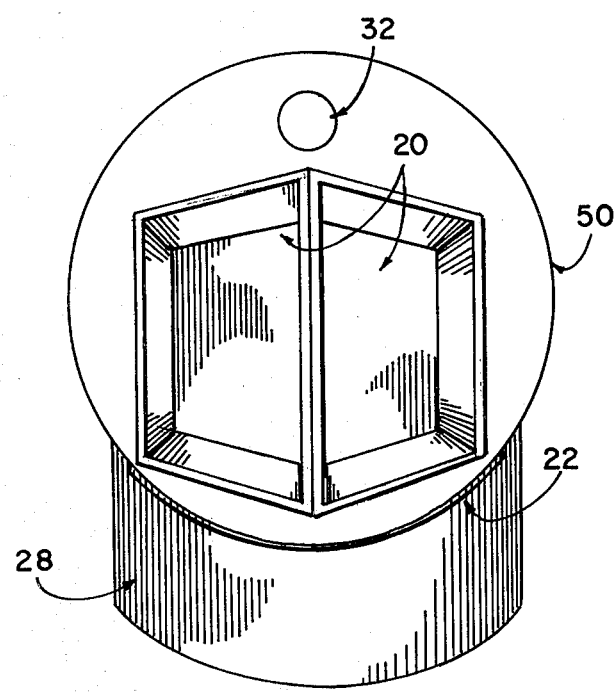
FIG. 3 illustrates a top cutaway view through section B—B of FIG. 1 showing the emptying trays and egress means therefor.

FIG. 2 illustrates a top view of the waste pile platform 16 through section A—A of FIG. 1 showing elongated perforations 44 and air bypass tube hole 46 through which the air bypass tube passes. The elongated perforations allow for the decomposed humus to fall through into emptying trays 20 below.

FIG. 3 illustrates a top cutaway view just above the emptying trays showing emptying trays 20 and egress means therefor through section B—B of FIG. 1. Seen in this view are air bypass tube 32, casing of foot rest member 28 and outer casing 50 of the composting toilet. Door 22 giving access to decomposition chamber 10 is illustrated. Easy access to door 22 can be gained by moving foot rest member 28 upwards on hinges 53 or equivalent means for easy removal and replacement of emptying trays 20. Emptying trays 20 are designed so that one does not necessarily have to carry both trays at one time but can remove them one tray at a time through door 22 by reaching in and pushing one tray somewhat to the side and removing the other in order to empty it. The second tray can be easily removed after the first tray has been removed.

Although the present invention has been described with reference to particular embodiments, it will be apparent to those skilled in the art that variations and modifications can be substituted therefor without departing from the principles and spirit of the invention.

I claim:

1. An improved composting toilet comprising:
   a substantially hollow casing having a substantially flat top and bottom and a front and rear, said casing's top having defined therein a waste entry aperture in proximity to the front of said casing and an air vent chimney aperture defined therein in proximity to the rear of said casing;
   a lid member covering said waste entry aperture, said lid member being adapted to be manually opened in order to allow access to said waste entry aperture;
   an air vent chimney positioned at said air vent chimney aperture;
   a concave waste pile platform horizontally disposed intermedially within said hollow casing making contact around its perimeter with the interior of said hollow casing, said waste pile platform having defined therein a plurality of parallel elongated apertures running lengthwise in a front to back direction within said casing and further having defined therein an air bypass tube aperture positioned at a point directly below said air vent chimney, the hollow of said concavity of said waste pile platform facing said casing top;
   an air bypass tube positioned at said air bypass tube aperture and extending upwards, its top being disposed at the bottom of said air vent chimney, said air bypass tube's cross-sectional area being smaller than the cross-sectional area of said air vent chimney, said air bypass tube adapted to allow air to pass into said air vent chimney from the area below said waste pile platform, said air vent chimney further having defined therein a cutaway section facing said casing's front beneath said casing's top;

a blower affixed beneath said casing top adapted to blow air up said air vent chimney thereby assisting in circulation of air within said casing;

a waste product area defined within said casing below said waste pile platform having positioned therein at least one removable container adapted to rest on said casing's bottom to catch waste products which may fall through said elongated apertures in said waste pile platform;

a door positioned in the side at the front base of said casing lower than the disposition of said waste pile platform within said casing, said door adapted to allow for the removal and reentry of said container for the purpose of emptying waste products from therein;

a hot air entry vent defined within said casing above said door and below the disposition of said waste pile platform, said hot air entry vent having disposed before it outside of said casing a heating blower having a thermostat control located within said waste product area in proximity to said hot air entry vent; and means to support, cover, and protect said heating blower, said means having defined therein at least one air intake vent.

2. The toilet of claim 1 wherein both said air vent chimney and said air bypass tube are circular in cross-section and said air bypass tube is one-half the diameter of said air vent chimney.

3. The toilet of claim 1 wherein said waste product area has positioned therein two containers which rest upon said casing's bottom, said containers adapted to be positioned adjacent to one another and to be removed and reinserted through said door one at a time.

4. The toilet of claim 1 wherein said casing is substantially cylindrical.

5. The toilet of claim 4 wherein said elongated apertures nearer the center of said waste pile platform are longer than those elongated apertures located further away from the center of said waste pile platform.

* * * * *